US010579782B2

(12) United States Patent
Holyoake et al.

(10) Patent No.: US 10,579,782 B2
(45) Date of Patent: *Mar. 3, 2020

(54) PROVIDING A USER ACCESS TO A COMPUTER SYSTEM

(71) Applicant: International Business Machines Corporation, Armonk, NY (US)

(72) Inventors: Colin I. Holyoake, Winchester (GB); James S. Taylor, Hedge End (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,255

(22) Filed: Jan. 9, 2019

(65) Prior Publication Data
US 2019/0147146 A1    May 16, 2019

Related U.S. Application Data

(63) Continuation of application No. 14/728,075, filed on Jun. 2, 2015, now Pat. No. 10,229,254.

(30) Foreign Application Priority Data

Jun. 3, 2014 (GB) .................................. 1409844.6

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)
(Continued)

(52) U.S. Cl.
CPC .............. *G06F 21/31* (2013.01); *G06F 21/83* (2013.01)

(58) Field of Classification Search
CPC .......... G06F 21/31; G06F 21/83; G06F 3/016; H04W 12/06
See application file for complete search history.

(56) References Cited

U.S. PATENT DOCUMENTS

2007/0046627 A1  3/2007  Soh et al.
2009/0179779 A1  7/2009  Katayama et al.
2011/0032211 A1  2/2011  Christoffersen
(Continued)

FOREIGN PATENT DOCUMENTS

EP       0306997 A2      3/1989
GB       1595047 A       8/1981
WO    WO2007096648 A1    8/2007

OTHER PUBLICATIONS

Intellectual Property Office Search Report, dated Dec. 3, 2014, regarding Application No. GB1409844.6, 3 pages.
(Continued)

*Primary Examiner* — Trong H Nguyen
(74) *Attorney, Agent, or Firm* — Yee & Associates, P.C.

(57) ABSTRACT

A method and related electronic apparatus for providing a user access to a computer system, the method comprising: determining at least one object in contact with a surface; generating at least one pulse sequence; actuating the surface based on the at least one pulse sequence; determining an absence of the at least one object from the surface; determining at least one character of a password input based on the at least one pulse sequence.

20 Claims, 6 Drawing Sheets

(51) Int. Cl.
*G06F 21/31* (2013.01)
*G06F 21/83* (2013.01)

(56) References Cited

U.S. PATENT DOCUMENTS

| | | | |
|---|---|---|---|
| 2012/0256723 A1* | 10/2012 | Grover | G06F 21/31 340/5.8 |
| 2012/0319956 A1 | 12/2012 | Suwald | |
| 2013/0086389 A1 | 4/2013 | Talach et al. | |
| 2015/0199016 A1* | 7/2015 | Suzuki | G06F 21/31 345/173 |
| 2015/0347728 A1 | 12/2015 | Holyoake et al. | |

OTHER PUBLICATIONS

Bianchi et al., "The Secure Haptic Keypad: A Tactile Password System," Proceedings of the SIGCHI Conference on Human Factors in Computing Systems (CHI '10), Apr. 2010, pp. 1089-1092.
De Souza Faria et al., "Identification of Pressed Keys from Mechanical Vibrations," IEEE Transactions on Information Forensics and Security, vol. 8, No. 7, Jul. 2013, pp. 1221-1229.

* cited by examiner

PROVIDING A USER ACCESS TO A COMPUTER SYSTEM

CROSS-REFERENCE TO RELATED APPLICATION(S)

This application claims the benefit of priority to United Kingdom Patent Application No. GB1409844.6, filed Jun. 3, 2014, and U.S. patent application Ser. No. 14/728,075, filed Jun. 2, 2015, the entire contents of which are incorporated herein by reference.

FIELD OF THE INVENTION

The present invention relates to a method and apparatus for providing a user access to a computer system. The present invention further relates to a computer program product comprising computer-readable program code for implementing the steps of such a method when executed on a computer. The present invention yet further relates to but not exclusively for an automated teller machine comprising the apparatus for providing a user access to a computer system.

BACKGROUND

The accessing of electronic equipment by unauthorized users is a known problem. There is known method and apparatus for identifying a user through a user's input of a pre-registered identification code. For example, a user of an automated teller machine (ATM) inputs a four-digit personal identification number (PIN) using keys or buttons representing the numbers 0 to 9. Similarly many mobile devices, such as mobile phones and tablet computers are 'locked' and can be 'unlocked' by entering a similar pre-registered security code or password formed from numbers.

Such identification apparatus and methods have a security problem. For example with respect to a banking computer system a stranger can discover the PIN by surreptitiously watching the user operate the keys, and by skimming (copying the data) on the bank card the stranger can successfully identify themselves as a proper user to access the bank details of the user. Similarly with respect to a mobile apparatus, by observing the user 'unlock' the mobile apparatus then the device can be activated and used without the user's knowledge.

This observation can be direct, the over the shoulder or hidden camera observation, or can be indirect, for example using a thermal imaging device to observe 'hot spots' on the keypad or observing fingerprints caused by sweat or grease deposited on the surface when in use. Although users can attempt to obscure their fingers as they key in the code by using their other hand, or wallet as a shield, this approach is problematic as the user can often find it hard to know which button their finger is aligned with when operating the keys or buttons.

Some approaches have been proposed such as described in JP-A-2004-46548, where when a key is held down for a predetermined period to input a corresponding numeral, the numeral can be input a predetermined times during the predetermined period, and further, vibration of a vibrator notifies a user of the number of numeral inputs. Thus when the numerals in adjacent digits are entered by holding down the numeric key, it becomes difficult for a stranger to recognize, by observation of the keys or button pad alone, how often the numeral is input.

However the PIN code as implemented in JP-A-2004-46548 needs to include identical numerals in adjacent digits. This restricts PIN code flexibility in normal 4 digit codes and otherwise can cause the PIN code to become long. Furthermore although ISO standards relating to PIN codes allow codes up to 12 digits many systems do not support the entry of PIN or security codes more than 6 digits.

A further approach as discussed in US20090179779 describes where an identification code is created by combining multiple information items. One or more of multiple tactile information items that represent a created identification code are produced based on a correspondence relation between the multiple tactile information items and the multiple information units. Further, identification is performed based on determining whether the created identification code is equal to the identification code that is actually input in response to the producing of the one or more of the multiple tactile information items that represents the created identification code.

BRIEF SUMMARY OF THE INVENTION

The present invention seeks to provide a more robust method and apparatus for providing a user access to a computer system.

The present invention further seeks to provide a computer program product comprising computer-readable program code for implementing the steps of such a method when executed on a computer.

According to an aspect of the present invention, there is provided a method for providing a user access to a computer system, the method comprising: determining at least one object in contact with a surface; generating at least one pulse sequence based on determining the at least one object in contact with the surface; actuating the surface based on the at least one pulse sequence; determining an absence of the at least one object from the surface; determining at least one character of a password input for providing access to a computer system based on the at least one pulse sequence before the absence of the at least one object from the surface.

In such embodiments the determination of at least one character of a password based on the at least one pulse sequence reduces the possibility of a security code or password being observed and therefore increases the security of such as system for providing a user access to a computer system.

Determining at least one object in contact with a surface may comprise determining at least one object in contact with a surface at a determined location or key.

In such embodiments the determination of the at least one object in contact with a surface is based on the contact occurring at a determined location, such as virtual key on a display surface, or a determined key or button location. For example in some embodiments the determined location is the enter key or enter virtual key location.

Generating at least one pulse sequence may comprise generating a series of pulse sequences separated by a determined time period while the at least one object is in contact with the surface at the determined location or key.

In such embodiments the pulse sequence is generated only when the at least one object, such as the user's finger, is determined to be in contact with the surface, at the determined area such as the enter key or the location of the enter virtual key.

Actuating the surface based on the at least one pulse sequence may comprise sequentially actuating the surface using the series of pulse sequences while the at least one object is in contact with the surface at the determined location or key.

In such embodiments the actuation of the surface is touch dependent and therefore prevents unnecessary movement of the surface. In some embodiments the actuation of the surface may furthermore be at the determined location, for example the enter key is actuated.

Determining at least one character of a password input based on the at least one pulse sequence may comprise determining at least one character based on the last one of the pulse sequences actuated before determining the absence of the at least one object from the surface at the determined location or key.

In such embodiments the character of the password input for providing access to the computer system, such as the personal identification number or other security code is determined or generated from based on the pulse sequences actuating the surface up to when the at least one object, such as the finger on the keypad or button, is removed from the determined location.

The method may further comprise determining at least one further character of a password input based on a location of the at least one object in contact with a surface.

The method may further comprise determining at least one further character of a password input based on a key or virtual key location value at the point of contact between the at least one object and the surface.

In such embodiments the password input or personal identification number or security code for providing access to the computer can be generated by a combination of key (or virtual key location) value and the pulse sequence/ actuated surface tactile character password input method described herein.

The method as discussed herein may further comprise determining a password input for accessing the computer system, wherein determining a password input may comprise: determining at least one character of a password input based on a key or virtual key location value; and determining a last character of a password input based on determining at least one object in contact with the surface; generating at least one pulse sequence based on determining the at least one object in contact with the surface; actuating the surface based on the at least one pulse sequence; determining an absence of the at least one object from the surface; and determining the last character based on the at least one pulse sequence before the absence of the at least one object from the surface as discussed herein.

In such embodiments the password input or personal identification number or security code can be generated using a combination of inputs to further improve security and efficiency of input.

Determining at least one object in contact with a surface may comprise determining the at least one object is in contact with an enter key or enter virtual key location on the surface and determining the absence of the at least one object from the surface may comprise determining an absence of the at least one object in contact with the enter key or enter virtual key location on the surface.

In such embodiments the password input or personal identification number or security code character can be provided as the user is contacting or touching the enter key or button rather than a number key which may assist the observer in identifying a previous character input.

Generating at least one pulse sequence may comprise generating groups of at least one pulse, each group of at least one pulse separated by a determined time period, wherein determining at least one character of a password input based on the at least one pulse sequence may comprise counting the number of groups of at least one pulse prior to determining an absence of the at least one object from the surface to determine the at least one character.

Thus in some embodiments the password input or personal identification number or security code can be generated by the contacting or touching of the surface for a determined period of time indicated to the user by the number of pulses between contacting and removing the contact. For example where the user experiences three pulses before removing their finger the character input is the number 3.

Generating at least one pulse sequence may comprise generating groups of sequentially increasing numbers of pulses, each separated by a determined time period, wherein determining at least one character of a password input based on the at least one pulse sequence may comprise determining the number of pulses in the group of pulses prior to determining an absence of the at least one object from the surface to determine the at least one character.

Thus in some embodiments the password input or personal identification number or security code can be generated by the contacting or touching of the surface for a determined period of time wherein the number to be input is indicated to the user by the number of pulses or relative length of the number of pulses in a group of pulses before removing the contact. For example where the user experiences a first group of one pulse, a determined time period pause, a second group of two pulses, a determine time period pause and then a third group of three pulses before removing their finger the character input can be in some embodiments the number 3.

Generating at least one pulse sequence may comprise: pseudo-randomly distributing numbers from a range of numbers; generating groups of pulse(s) associated with the numbers according to the pseudo-random distribution; each group of pulses separated by a determined time period, wherein determining at least one character of a password input based on the at least one pulse sequence may comprise determining the number of pulses in the group of pulses prior to determining an absence of the at least one object from the surface to determine the at least one character.

Thus in some embodiments the password input or personal identification number or security code can be generated by the number of pulses between contacting and removing the contact, where the order of the number of pulses in the group is pseudo-randomly ordered. For example where the user experiences a first group of five pulses, a second group of two pulses, and then a third group of seven pulses before removing their finger the character input can be in some embodiments the number 7.

The range of numbers may be the range from 0 to 9.

Generating at least one pulse sequence may comprise generating groups of a constant number of pulse(s), each group separated by a determined time period, and wherein determining at least one character of a password input based on the at least one pulse sequence may comprise counting the number of determined time periods prior to determining an absence of the at least one object from the surface to determine the at least one character.

Thus in some embodiments the password input or personal identification number or security code can be generated by the contacting or touching of the surface for a determined period of time indicated to the user by the number of pulses between contacting and removing the contact. For example where the user experiences three pauses or determined time periods between groups of pulses before removing their finger the character input can be in some embodiments the number 3.

Generating at least one pulse sequence may comprise generating at least one group of pulses of different lengths, each group separated by a determined time period, wherein determining at least one character of a password input based on the at least one pulse sequence may comprise determining a value associated with the group of pulses of different lengths prior to determining an absence of the at least one object from the surface.

Thus in some embodiments the password input or personal identification number or security code can be generated by the number and length of pulses between contacting and removing the contact from the surface. For example where the user experiences a group of pulses one short and four long before removing their finger the character input can in some embodiments be the number 1 as would be understood from the Morse code for the number 1. Similarly in some embodiments where the user experiences a group of pulses short, short, short, long before removing their finger then the character input can be the number 1 as would be understood from the binary coded decimal code where a short pulse is a zero and a long pulse a one value.

The method may further comprise pseudo-randomly determining the time period for the determined time period.

Actuating the surface based on the at least one pulse sequence may comprise actuating the surface by an air pump controlled based on the at least one pulse sequence.

Actuating the surface based on the at least one pulse sequence may comprise actuating the surface by a coil and permanent magnet, wherein the current passing through the coil is controlled based on the at least one pulse sequence.

Actuating the surface based on the at least one pulse sequence may comprise actuating the surface by a vibra controlled based on the at least one pulse sequence.

Actuating the surface based on the at least one pulse sequence may comprise actuating the surface by a piezo-electric actuator controlled based on the at least one pulse sequence.

Actuating the surface based on the at least one pulse sequence may comprise actuating a button or key located on the surface by an actuator, the button or key and the actuator being damped with respect the surrounding surface.

The method may further comprise: determining a first identifier prior to determining the password input; authenticating the first identifier against a stored identifier value; validating the password input against a stored password associated with the stored identifier value.

According to a second aspect there is further provided an electronic apparatus for providing a user access to a computer system, apparatus comprising: a contact determiner configured to determine at least one object in contact with a surface; and furthermore configured to determine an absence of the at least one object from the surface; a pulse sequence generator configured to generate at least one pulse sequence based on the contact determiner; an actuator configured to actuate the surface based on the at least one pulse sequence; and an output generator configured to determine at least one character of a password input for providing access to the computer system based on the pulse sequence generator and the contact determiner.

The contact determiner may be further configured to determine at least one object in contact with a surface at a determined location or key.

The pulse sequence generator may be configured to generate a series of pulse sequences separated by a determined time period based on the contact determiner determines the at least one object in contact with the surface at a determined location or key.

The actuator may be configured to actuate the surface using the series of pulse sequences while the at least one object is in contact with the surface at a determined location or key.

The output generator may be configured to determine at least one character based on the last one of the pulse sequence actuated before the contact determiner determines the absence of the at least one object from the surface at a determined location or key.

The output generator may further be configured to determine at least one further character of a password input based on a surface location or key location of the at least one object in contact with a surface.

The contact determiner may be configured to determine a contact location or key contact associated with the at least one object in contact with the surface.

The output generator may further be configured to determine at least one further character of a password input based on a contact location or key contact associated with the at least one object in contact with the surface.

The electronic apparatus may further be configured to determine a password input for providing access to a computer system, wherein determining the password input may comprise: the output generator configured to determine at least one character of a password input based on the contact location or key contact associated with the at least one object in contact with the surface; and the output generator configured to determine a last character of a password input based on the last one of the pulse sequence actuated before the contact determiner determines the absence of the at least one object from the surface.

The contact determiner may be configured to determine the at least one object is in contact with an enter key or enter virtual key location on the surface and determine an absence of the at least one object in contact with the enter key or enter virtual key location on the surface.

The pulse sequence generator may be configured to generate groups of at least one pulse, each group of at least one pulse separated by a determined time period, wherein the output generator may be configured to count the number of groups of at least one pulse prior to the contact determiner determining an absence of the at least one object from the surface to determine the at least one character.

The pulse sequence generator may be configured to generate groups of sequentially increasing numbers of pulses, each separated by a determined time period, wherein the output generator may be configured to determine the number of pulses in the pulse number group prior to the contact determiner determining an absence of the at least one object from the surface to determine the at least one character.

The pulse sequence generator may be configured to generate a pseudo-random distribution of numbers from a range of numbers and generate groups of pulse(s) associated with the number according to the pseudo-random distribution, each group of pulses separated by a determined time period; and the output generator may be configured to determine the number of pulses in the pulse group prior to determining an absence of the at least one object from the surface to determine the at least one character.

The range of numbers may be the range from 0 to 9.

The pulse sequence generator may be configured to generate groups of a constant number of pulse(s), each group separated by a determined time period, and wherein the output generator may be configured to determine the number of determined time periods prior to determining an absence of the at least one object from the surface to determine the at least one character.

The pulse sequence generator may be configured to generate a sequence comprising pulses of different lengths, each sequence separated by a determined time period, wherein the output generator may be configured to determine a value associated with the sequence comprising pulses of different lengths prior to determining an absence of the at least one object from the surface to determine the at least one character.

The pulse sequence generator may be configured to pseudo-randomly determine the time period for the determined time period.

The actuator may comprise an air pump controlled based on the at least one pulse sequence.

The actuator may comprise a coil and permanent magnet, wherein the current passing though the coil is controlled based on the at least one pulse sequence.

The actuator may comprise a vibra controlled based on the at least one pulse sequence.

The actuator may comprise a piezo-electric actuator controlled based on the at least one pulse sequence.

The actuator may be configured to actuate a button or key located on the surface, wherein the button or key and the actuator are damped with respect the surrounding surface.

An automated teller machine may comprise: a card reader configured to read a card comprising a first identifier prior to determining the password input; an authenticator configured to authenticate the first identifier against a stored identifier value; the electronic apparatus for providing a user access to a computer system as described herein; and a password validator configured to validate the password input against a stored password associated with the stored identifier value.

A computer system may comprise: the electronic apparatus for providing a user access to a computer system as described herein; a password validator configured to prove access to the computer system based on the password as input by the electronic apparatus.

BRIEF DESCRIPTION OF THE DRAWINGS

Preferred embodiments of the present invention will now be described, by way of example only, with reference to the following drawings, in which.

DETAILED DESCRIPTION OF THE EMBODIMENTS

Figure 1:
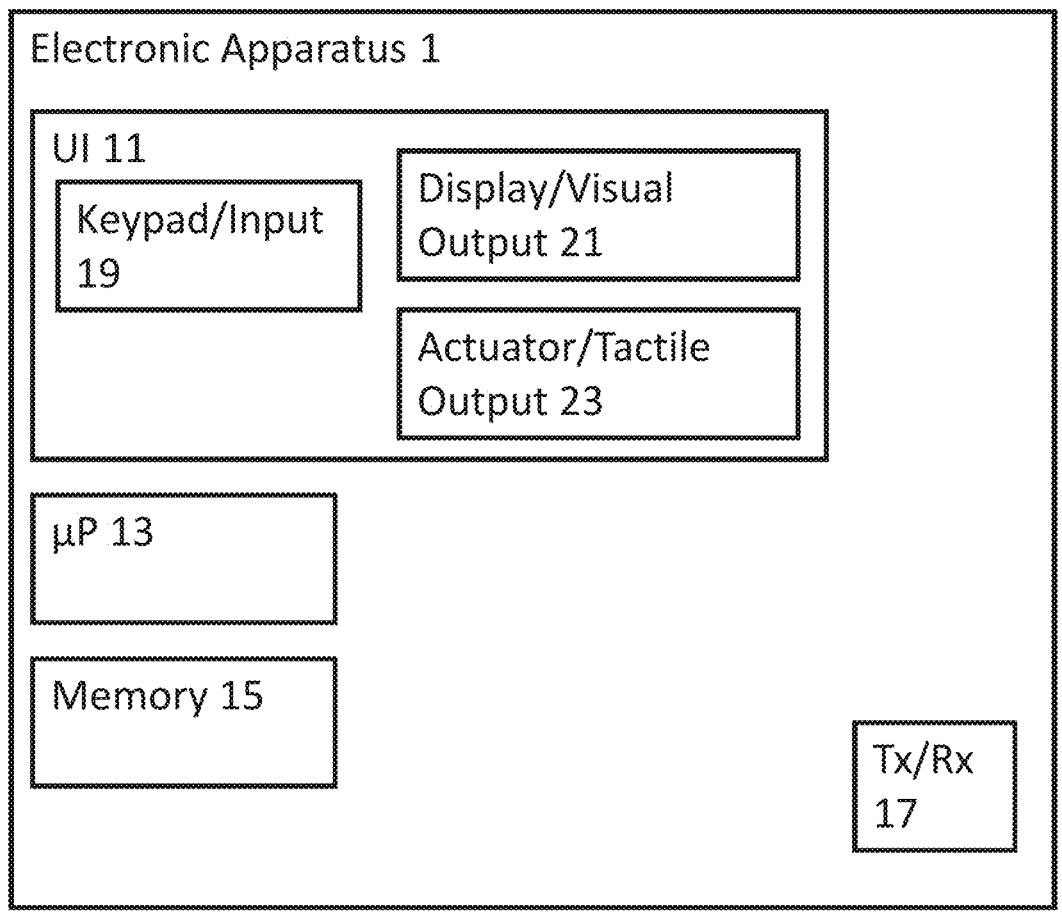
FIG. 1 schematically depicts an electronic apparatus suitable for implementing some embodiments.

It should be understood that the Figures are merely schematic and are not drawn to scale. It should also be understood that the same reference numerals are used throughout the Figures to indicate the same or similar parts.

In the context of the present application, where some embodiments of the present invention constitute a method, it should be understood that such methods can involve a process for execution by a computer, i.e. a computer-implementable method. Some of the various steps of the method can therefore reflect various parts of a computer program, e.g. various parts of one or more algorithms.

The various embodiments of the method of the present invention may be stored as computer-executable program code on a computer program product comprising a computer-readable storage medium. The computer-readable storage medium may be any medium that can be accessed by a computer for the retrieval of digital data from said medium. Non-limiting examples of a computer-readable storage medium include a CD, DVD, flash memory card, a USB memory stick, a random access memory, a read-only memory, a computer hard disk, a storage area network, a network server, an Internet server and so on.

In the context of the present disclosure, a (computer) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention. Similarly it would be understood that in the context of the present disclosure the computer system can be any suitable electronic apparatus comprising at least one processor. For example although the following disclosure is based largely on an automated teller machine (ATM) for providing access to a banking computer system it would be understood that the same apparatus and methods may be applicable to any electronic apparatus for providing access to a computer system.

In some embodiments the electronic apparatus and computer system are the same. For example the electronic apparatus and computer system can be a personal computer, tablet computing apparatus, user equipment, or smartphone, which require a password to unlock or access the apparatus.

In some embodiments the electronic apparatus and computer system can be physically separate apparatus or devices configured to communicate with each other, for example over a wireless telecommunications link. For example the electronic apparatus can be a home security or automation interface apparatus (such as an application interface run on a tablet computer configured to communicate with the home security or automation controller).

With respect to FIG. 1 an example an electronic apparatus 1 suitable for providing access to a computer system is shown. In the following description the focus is with respect to the inputting or entering a suitable password (or PIN number or security code) by a keypad or buttons or switches (or virtual keypad or keys). As such the operations of authentication of the password are mentioned only in passing and any suitable authentication method applied. Thus in some embodiments the password formed from the characters input as described herein can be authenticated on the electronic apparatus, or encrypted and transmitted to be authenticated at a remote computer or computer system. Furthermore in some embodiments the authentication as implemented as a result of the password formed from the characters input as described herein can be one part of a multistage authentication. For example, following the introduction of a bank card into a card reader, a security tag comprising an identifier, or a biometric identification operation.

Furthermore although the following description is with respect to an number or numeric password it would be understood that in some embodiments an alpha-numeric password can be formed from apparatus and methods as described herein. For example in some embodiments each alphabet character is associated with a number or numeric value—such as an ASCII encoding of the alphabet or a entropy encoding of the alphabet.

As described herein the electronic apparatus 1 can be any suitable electronic apparatus such as for example an automated teller machine (ATM), a personal computer (PC), a tablet computer, or other mobile device for example user equipment or other mobile phone apparatus.

The electronic apparatus 1 in some embodiments comprises at least one microprocessor (µP) 13. The microprocessor 13 may be any suitable processing means or apparatus and be configured to fetch and execute computer executable program code.

The electronic apparatus 1 in some embodiments comprises at least one memory 15. The computer executable program code may for example be stored on a memory 15 which is a computer readable storage medium of any suitable form. The computer readable storage medium may for example include a CD, DVD, flash memory card, a USB memory stick, a random access memory, a read only memory, a computer hard disk, a storage area network, a network server, an internet server and so on. The memory 15 can also comprise in some embodiments a section suitable for storing data being operated on or generated by the electronic apparatus 1.

Furthermore in some embodiments the end user apparatus 1 may comprise a user interface (UI) 11 configured to enable the user (or end user) to interact with the electronic apparatus 1. The user interface 11 may for example comprise any suitable input apparatus or means such as: a keyboard, a mouse, a touch screen input, a digital key reader; a digital token reader. Furthermore the user interface 11 may comprise any suitable output apparatus or means such as: a display of any suitable format such as LED, OLED, LCD or printed display, a speaker or headset suitable for providing an audio output, or a tactile output such as a vibra for providing touch based output.

In some embodiments the user interface 11 comprises a keypad/input device 19 to operate as a suitable input apparatus or means. In some embodiments the keypad/input device 19 is a physical keypad on which can be printed or displayed the value associated with each of the keys. For example the keypad can comprise a numerical keypad wherein the keys are physical keys or buttons which when depressed actuate a switch or other mechanical device which is registered by the microprocessor 13. In some embodiments the keypad/input device 19 is a virtual keypad, in other words an image displayed by a display which when an object is placed in proximity or in contact with the location of an image key generates a signal which can be passed to the microprocessor to register the contact or proximity.

In some embodiments the user interface comprises a display/visual output 21. The display/visual output 21 for example can be a display suitable for providing the user an indication or instruction of the current access requirements. For example the display/visual output 21 can display a message indicating to the user that the user is to enter the personal identification number (PIN). In some embodiments the display/visual output 21 is configured to display an image of a keypad and operate as a virtual keypad or input device. In such embodiments the display/visual output 21 can be configured to operate also as the keypad/input device 19. In such embodiments the display/visual output 21 can be a touch screen wherein the display is sensitive to proximity or contact. For example in some embodiments the touch screen is a capacitive touch screen, resistive touch screen or optically monitored touch screen. In some embodiments the display/visual output 21 is controlled by the microprocessor 13 based on the keypad/input device inputs.

In some embodiments the user interface 11 further comprises at least one actuator (tactile output or tactile output means) 23. The at least one actuator 23 can in some embodiments be located within or underneath the keypad/input device 19 and configured to generate a tactile experience when the key is touched or contacted. It would be understood that in some embodiments there can be implemented more than one actuator 23. For example in some embodiments more than one key or button of the keypad/input device is coupled to an associated and separably controllable actuator.

The at least one actuator 23 can be implemented according to any suitable actuator technology. For example in some embodiments the actuator is a continuous air pump with a computer controlled valve which permits the flow of air into a simple piston coupled to the key (button or surface more generally) to drive the motion of the key. It would be understood that in some embodiments the piston is coupled directly to the key (or surface) and in some embodiments the piston is coupled indirectly via a rubber or other suspension or shock absorbing element configured to tune the motion of the key (or surface) to produce a desired movement.

In some embodiments the actuator/tactile output 23 can be implemented by a suitable electro-magnetic actuator, for example a conductive coil with a permanent magnet located within the coil. The permanent magnet can in some embodiments be either coupled to the key (or surface) directly or indirectly via a rubber or other suspension or shock absorbing element configured to tune the motion of the key (or surface) to produce a desired movement. The magnet can in such situations be configured to move or actuate the key (or surface) when the coil is energized.

It would be understood that in some embodiments a moving coil electromagnetic actuator can in some embodiments be employed where the permanent magnet is fixed and the coil coupled directly or indirectly to the key (or surface).

In some embodiments the actuator 23 can be implemented by a vibra, such as an electric motor with an off balanced load. The off balanced load when rotated causes a movement of the key or surface based on the speed of rotation, the mass of the load and the offset of the load.

In some embodiments the actuator/tactile output 23 can be implemented by a piezo-electric actuator coupled directly or indirectly with the key (or surface). In such embodiments the piezo-electric actuator can for example be configured such as the ends of the piezo-electric actuator are coupled to the electric apparatus body and the central portion of the piezo-electric actuator coupled to the key or surface such that the bending motion of the piezo-electric actuator when a current is passed through the material causes a motion of the key or surface relative to the body of the apparatus.

It would be understood is that in some embodiments the actuator 23 is located such that it is able to move the display 21 in embodiments where the display 21 is implementing a virtual keypad/input device 19.

In some embodiments of the actuator 23 is controlled by the microprocessor 13 based on the keypad/input device 19 inputs.

The electronic apparatus 1 may further in some embodiments comprise a transceiver (Tx/Rx) 17 suitable for communicating to further electronic apparatus or devices, such as the computer system to be accessed by the user.

Figure 2:
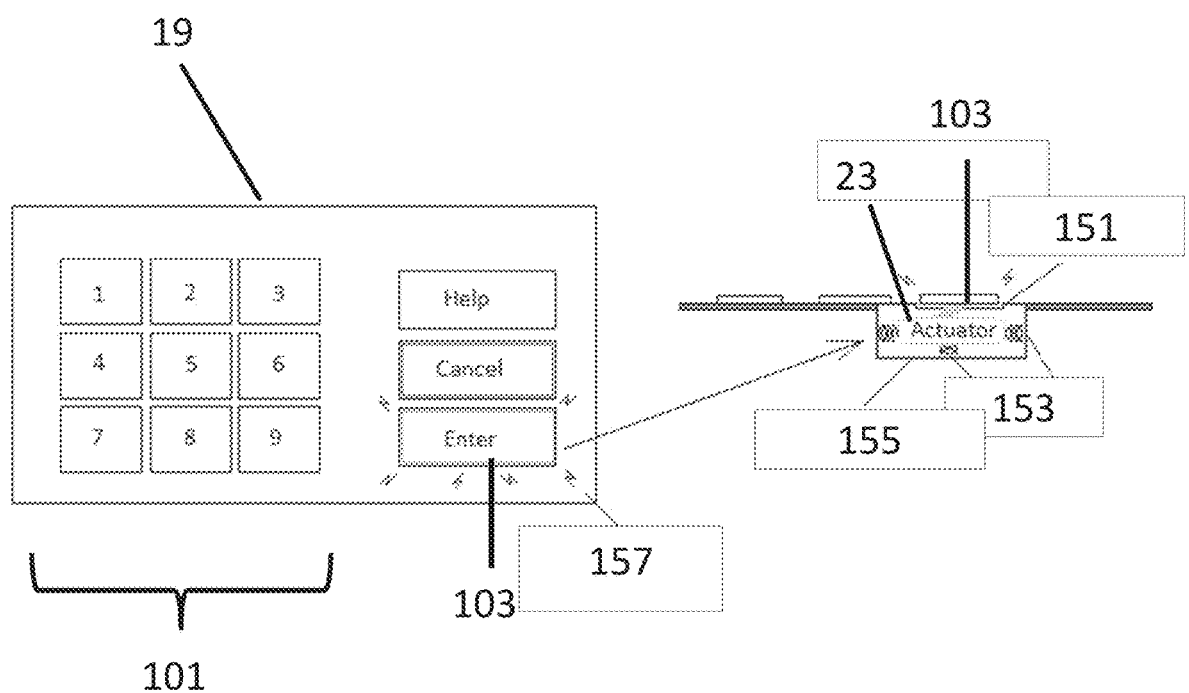
FIG. 2 schematically depicts an example keypad/input apparatus according to some embodiments.

With respect to FIG. 2 an example implementation of a user interface 11 comprising a physical keypad 19 and actuator 23 is shown. In the following examples the embodiments described an automated teller machine (ATM) physical keypad coupled with a suitable actuator 23. FIG. 2 shows on the left side a plan view of an example physical keypad with numerical keys 101 from 1 to 9 for providing a numerical input between the range of 1 and 9 and separate help, cancel and enter keys 103.

It would be understood that although the example shown in FIG. 2 shows a keypad with the numbers 1 to 9 in some embodiments the keypad may have a range of 0 and 9.

In the example shown herein there is provided one actuator configured to move 157 the enter key 103 configured to provide the tactile feedback.

The right hand side of FIG. 2 shows a cross-sectional view of the physical keypad 19. The enter key 103 is located over a suitable hollow 155. Within the hollow is located the actuator 23. In the example shown in figure to the actuator 23 is suspended or dampened by coil springs 153 mounted from the walls of the hollow 155. However it would be understood that a dampening of the actuator with respect to the electronic apparatus can be performed by any suitable dampening means. For example in some embodiments a rubber, plastic or other vibration dampening material can be used to mount the actuator 23 within the hollow 155. The actuator 23 is furthermore in coupled or connected in some embodiments to the physical enter key 103 by a rubber pad 151. The rubber pad 151 or other suitable vibration dampening or tuning device, such as a plastic or similar elastic material between the physical enter key 103 and the actuator 23 is configured to tune the vibration of the key or surface by the actuator 23 to produce an acceptable or desired movement.

Figure 3:
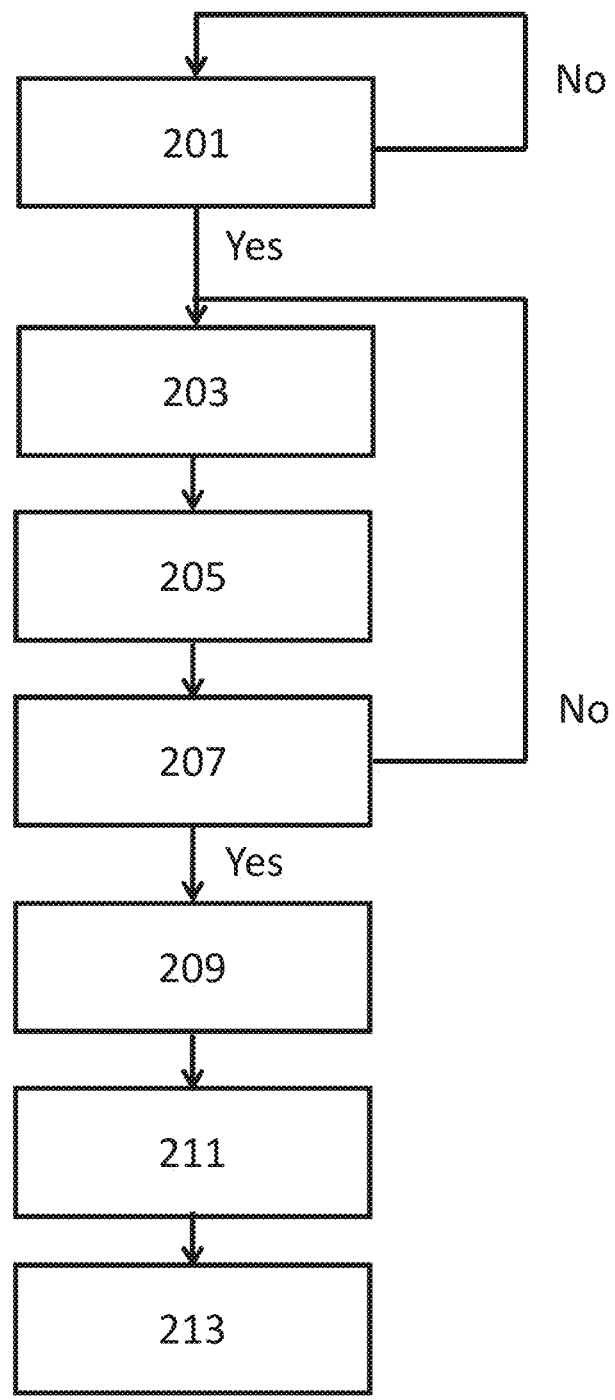
FIG. 3 schematically a depicts a flow diagram showing an example method of operating the electronic apparatus according to some embodiments.

With respect to FIG. 3 an example operation an automated teller machine (ATM) comprising the electronic apparatus 1 as described herein is described.

In some embodiments the ATM comprises a card reader configured to receive and read a suitable ATM card (or bank card, client card, key card, debit card, credit card or cash card). The card reader can be configured to read an integrated circuit embedded within the ATM card (or the magnetic strip on the reverse side of the ATM card). The card reader can for example in some embodiments determine that a cardholder verification involving a personal identification number is to be applied. Furthermore in some embodiments the card reader can for example determine the identity associated with the card.

Thus in some embodiments the ATM is configured to determine whether or not a card has been inserted into the electronic apparatus.

The operation of checking whether a suitable card has been inserted, in other words an insert card check operation is shown in FIG. 3 by step 201.

When the ATM determines that a suitable card requiring the input of a PIN number has been entered then the method can proceed, otherwise the method loops back to waiting to check whether a suitable card has been entered.

Figure 4:
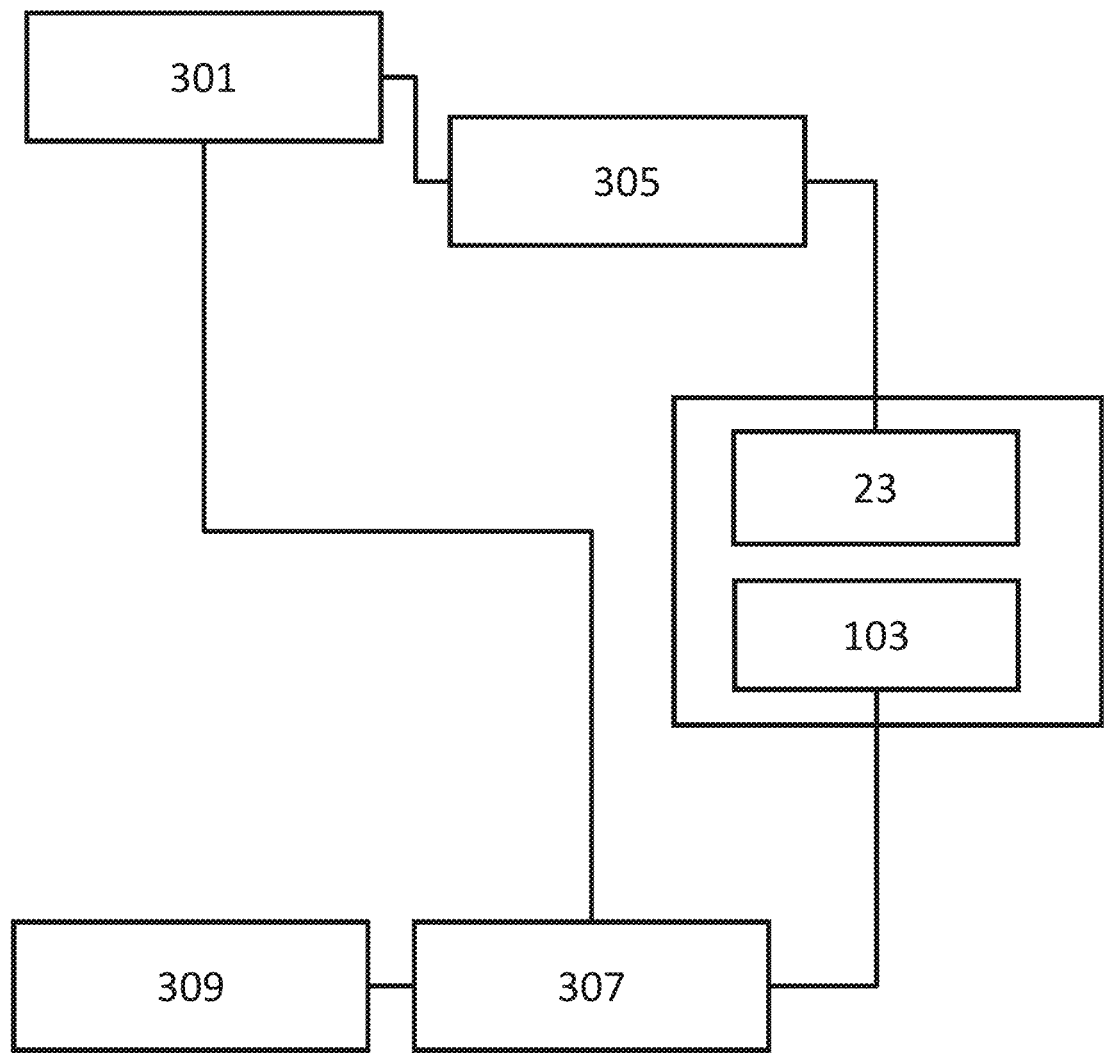
FIG. 4 schematically depicts example tactile password character input apparatus according to some embodiments.

With respect to FIG. 4 an example electronic apparatus suitable for providing a user access to a computer system such as shown in FIGS. 1 and 2 is shown in further detail.

In some embodiments the electronic apparatus comprises a contact (touch) determiner 307. The contact determiner 307 is configured to receive signals from the keypad 19 (or in some embodiments from the touch screen where the touch screen is implementing a virtual keypad). Specifically in some embodiments the contact determiner 307 is configured to receive the physical key outputs (for example the key switch outputs) generated by the numeric keys 101 and the other keys such as the enter key 103. It would be understood that in some embodiments of the contact determiner 307 further can receive and input from a touch screen interface, or example where the keypad is a virtual keypad implemented on the display of the touch screen.

The contact determiner 307 in some embodiments is configured to determine whether a contact has occurred with at least one of the keys (or at least one of the virtual key locations) and furthermore determine (or generate) a parameter associated with the key contact. For example in some embodiments the contact determiner 307 is configured to determine the value of the key (or the virtual key), the duration of contact of the key (or virtual key), or for example the periodicity of contact. It would be understood that in some embodiments that the contact determiner 307 can furthermore be configured to determine where contact has occurred that contact is no-longer occurring, in other words the absence of contact.

In some embodiments the contact determiner 307 can be configured to determine the at least one object which is in contact with the key (or more generally the surface). For example the contact determiner 307 can in some embodiments determine whether the object is a fingertip, a covered or gloved finger, a pointer, a pen or similar implement.

The contact determiner 307 can in some embodiments output a signal to a keypad output generator 309 and the pulse sequence generator 301 for the effect of controlling the operation of the output generator 309 and the pulse sequence generator 301.

The contact determiner 307 can therefore in some embodiments be configured to determine at least one object in contact with a surface for example a key press or key contact and pass a signal to the output generator 309.

The operation of determining a key press or key contact is shown in FIG. 3 by step 203.

In some embodiments the electronic apparatus comprises an (keypad) output generator 309 configured to determine and output a numerical or alpha-numerical string value or character associated with the determined key press or key contact. Thus for example in some embodiments the output generator 309 is configured to append a new recorded or determined keypad value. For example with respect to the example shown in FIG. 2 a number value between 1 and 9 can be added or appended to the output string for forming a password character string. In some embodiments of the output generator 309 is a further configured to not append the character value when a specific keypad or key value has been recorded. Thus for example in some embodiments the determination of a cancel, help or enter key value is configured to not append the value to the string and in some embodiments to perform a different operation. For example the cancel or clear key can cancel or clear the current operation by triggering a suitable interrupt process rather than appending a character. Similarly in some embodiments the determination of a help key value is configured to trigger a suitable help interrupt process rather than append a help key value to the password or string.

The operation of appending a key press value to the password number string is shown in FIG. 3 by step 205.

In some embodiments the contact determiner 307 (or in some embodiments the output generator 309) is further configured to detect whether the enter key was the key pressed.

The operation of checking whether the determined key pressed or contacted is the enter key is shown in FIG. 3 by step 207.

Where the contact determiner 307 (or output generator 309) determines that the key pressed or contacted is not the enter key then the operation can pass back to step 203 where the next contact is determined (in other words waiting for the next key press).

This loop is shown in FIG. 3 by the 'No' loop from the step 207 to the step 203.

In some embodiments where the contact touch determiner 307 (or the output generator 309) is configured to determine that the key pressed or contacted is the enter key then the contact touch determiner 307 or output generator 309) can be configured to initiate a tactile input operation.

A tactile input operation is one where the electronic apparatus is configured to generate a tactile effect (such as a pulse sequence) which is experienced by the user via the contacted (or touched) surface (for example the contacted key) and which indicates to a user a character value which when the contacted surface is released is then appended to the password.

The operation of determining a tactile input is shown in FIG. 3 by step 209.

The contact touch determiner 307 can then be configured to output the tactile input value to the output generator 309. The output generator can then in some embodiments be configured to append or output the tactile input value to the password (number) string for providing a password to be checked.

The operation of appending or outputting a tactile input value to the number string is shown in FIG. 3 by step 211.

The outputted password or string can then be authenticated by the ATM to determine whether the user is able to access the computer system.

The operation of authentication of the password or string comprising at least one tactile input value is shown in FIG. 3 by step 213.

It would be understood that when tactile or vibration-based input is used for the last of the pin number and when this is implemented using the enter key (or other non-numerical key) then in such embodiments the user is not required to 'hover' longer over the last numerical keypad button and therefore expose that number.

Figure 5:
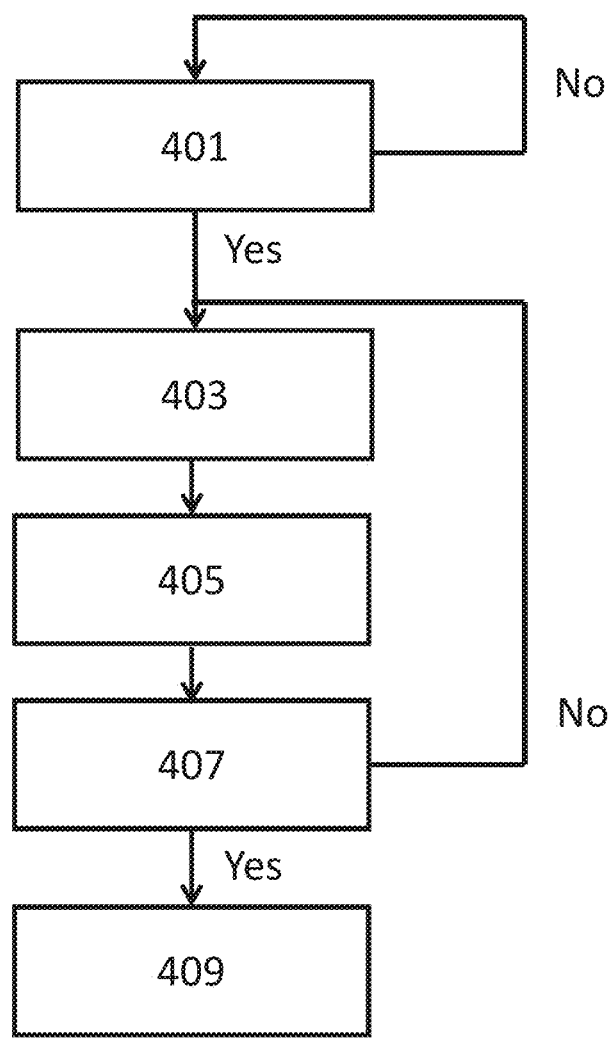
FIG. 5 schematically a depicts a flow diagram showing an example method of operating the tactile password character input apparatus according to some embodiments.

The operation of determining a tactile input value is shown with respect to the flow diagram shown in FIG. 5, and furthermore with regards to the electronic apparatus shown in FIG. 4.

In some embodiments the electronic apparatus comprises a pulse sequence generator 301. The pulse sequence generator 301 is configured to generate suitable pulse sequence signals which can be passed to an actuator driver 305. The pulse sequence generator 301 can in some embodiments be controlled based on signals passed from the contact determiner 307 (and/or in some embodiments the keypad output generator 309).

Thus for example when the contact determiner 307 has determined that a key (or surface) has been pressed or contacted, then the contact determiner 307 is configured to provide an indicator or signal to the pulse sequence generator 301 to generate at least one pulse sequence. It would be understood and as described herein the contact determiner 307 is configured to generate such a signal when determining at least one object in contact with the surface or key for a determined location or key, for example as described herein when the contact determiner 307 determines that the enter key has been pressed or contacted.

The operation of determining at least one object in contact (or touching) with a key or surface is shown in FIG. 5 by step 401.

The pulse sequence generator 301 can then in some embodiments be configured to begin generating a suitable pulse sequence. In some embodiments it would be understood that a first pulse sequence can be a group or sequence of zero pulses, a null pulse sequence, representing a tactile input value of 0. However in some embodiments the pulse sequence generator 301 is configured to generate a group of at least one pulse. The pulse sequence generator 301 can be configured to continue generating further groups of at least one pulse, where the sequences or groups are separated by a pause or determined time period.

The operation of generating a pulse sequence is shown in FIG. 5 by step 403.

The pulse sequence generator 301 can in some embodiments be configured to output the generated pulse sequence to the actuator driver 305.

The electronic apparatus in some embodiments comprises an actuator driver 305. The actuator driver 305 is configured to receive the generated pulse sequence and drive or power the actuator 23 such that a suitable tactile experience is provided. For example in some embodiments the actuator driver 305 comprises a control circuit for controlling the valve coupled to the air pump which is configured to move the piston coupled to the key (or surface more generally). In some embodiments it would be understood that the actuator driver 305 and the actuator 23 can be combined and the pulse sequence generator be configured to signal to the actuator 23 with the generated pulse sequence which actuates the key or surface.

The operation of driving the actuator with the pulse wave sequence is shown in FIG. 5 by step 405.

The contact determiner 307 is further configured to determine whether the at least one object (such as the finger) has been removed from the key or surface, in other to determine the absence of an object in contact with the surface or key. It would be understood that in some embodiments the contact determiner 307 is configured to determine whether the at least one object is still in contact with the key or surface and therefore by determining that the at least one object is still in contact determine that the at least one object is not absent.

The operation of detecting or determining the absence of the object from the surface or key is shown in FIG. 5 by step 407.

Where the absence of the object is not determined, in other words that the object (finger) is still in contact with the surface or key then the contact determiner 307 (or output generator 309) is further configured to signal to the pulse sequence generator 301 that the pulse wave sequences are to be continued. In some embodiments the contact determiner 307 is configured to determine that the object (the finger) is in contact with the surface (or key) and generate a signal which is passed to the pulse sequence generator 301 controlling the pulse sequence generator 301 to continue generating pulse sequences.

The operation of detecting or determining the removal of the object from the key has not occurred (that the object is still in contact) is shown in FIG. 5 by the loop from step 407 back to step 403.

The contact determiner 307 in some embodiments, after determining the absence of the object (in other words that the finger has been removed from the key), can be configured to determine and output a value based on the last pulse sequence to the keypad output generator 309. For example in the example described earlier where the pulse sequence generator 301 is configured to generate pulse sequences of groups of at least one pulse separated by a determined time period, then the contact determiner 307 can be configured to determine or count the number of sequences or groups of at least one pulse which have been output and this number. Thus for example where a single group of at least one pulse is output the number passed to the output generator 309 is 1, where two groups of at least one pulse are output the number is 2, and so on.

The operation of outputting a value based on the last pulse sequence before determining the absence of the object is shown in FIG. 5 by step 409.

The pulse sequence generator 301 and the determination of the contact determiner value passed to the output generator can be based on any suitable progression.

As described herein in some embodiments the contact determiner 307 is configured to operate as a counter which is incremented every time a pulse sequence is generated.

In some embodiments the number value 0 can represented or generated by the user removing the at least one object from the surface before a sequence is output. For example there is a determined time period following the determination of contact at the enter key and the output of the first generated sequence or group of a single pulse or pulses when the contact determiner 307 is configured to output a 0 value. In some moments the number value 0 can be represented or generated by maintaining contact with the surface or key and removing the contact after 10 sequences are generated and output.

In some embodiments the number value output is offset by one sequence. In other words the first sequence is associated with the number value zero, the second sequence is associated with the number value one and so on.

In some embodiments rather than counting the number of pulse sequences the contact determiner 307 is configured to count the determined periods or pause periods between the groups of the at least one pulse. In other words the pulse sequence generator and the actuator driver is configured to generate sequences of at least one pulse separated by a determined time period, wherein the contact determiner 307 is configured to generate a value based on the number of determined time periods experienced between the output sequences.

Thus in some embodiments the number value 0 is represented or generated by the user removing their finger or object of contact from the surface or key as the first sequence is generated, the value 1 is represented or generated by the user removing their finger or object of contact from the surface or key after the first time period, in other words during the second sequence of at least one pulse and so on.

It would be understood that in some embodiments the determined time period is a fixed period however in some embodiments the determined time period is a pseudo-randomly determined time period. A pseudo-randomly determined time period between pulses or groups of pulses (or in some embodiments the time period before the first actuated pulse or group of pulses) increases the security of the system as it prevents the casual observer from determining the 'entered' number by timing the contact period and dividing it by an observed pulse determined time period. Furthermore it would be understood that in some embodiments the pseudo-randomly determined time period in some embodiments is constant for a user, in other words the determined time period is generated for each user but constant for the user, or can be varied or changed between pulse sequences.

In some embodiments the pulse sequence generator 301 is configured to generate groups of sequentially increasing numbers of pulses for the sequences. For example in some embodiments the first pulse sequence is a single pulse or a first number of pulses, the second pulse sequence is a sequence of two pulses (or a second number of pulses, the second number being greater than the first number) and so on.

Thus in some embodiments the number value 1 can be represented by the first pulse sequence (a single pulse), the number value 2 is represented by the second pulse sequence (two pulses), the number value 3 is represented by the third pulse sequence (three pulses) and so on.

The number value 0 in such embodiments can be represented by releasing the contact from the surface before the first pulse sequence is output (or as described herein after the tenth pulse sequence).

In some embodiments the pulse sequence generator 301 is configured to generate pulse sequences associated with a number from a randomly distributed number range. In other words a number range (such as 0 to 9) is randomly distributed or pseudo-randomly distributed, a pulse sequence representing the number value is associated with the number value and the pulse sequences output according to the random or pseudo-random distribution. For example the pulse sequence generator 301 is configured to associate a single pulse (or a first number of pulses) with the number value 1, two pulses (or a second number of pulses greater than the first number) with the number value 2, three pulses (or a third number of pulses greater than the second number) with the number 3 and so on. These sequences are then output in an order determined by the random or pseudorandom ordering. In such embodiments the number value output is not directly represented by the length of time that the object is in contact with the surface and therefore the number value output cannot be estimated by observing the length of time the object is in contact with the surface or key.

In some embodiments of the pulse sequence generator is configured to generate either a sequentially increasing determined time period or a randomly distributed increasing time period similar to that described above with respect to the pulse sequences but applied to the pause or determined time periods between groups or sequences of pulses. In other words in some embodiments the number value 1 is represented by a first short determined period, the number value 2 is represented by a longer determined period, and the value 3 is represented by an even longer value than the longer determined period. The pulse sequence generator 301 can then be configured to output these determined periods between pulses either sequentially or according to a random or pseudo-random distribution order.

In some embodiments the pulse sequence generator 301 is configured to generate pulses of two or more different lengths to represent a number value. In some embodiments the number value associated with the pulses is such that the different lengths of pulse represent differing number values. For example the pulse sequence generator 301 can be configured to generate a number value represented by a known coding method such as Morse code, short Morse code, ASCII code, entropy code or other code. For example the Morse code representation of 1 can be a single short pulse followed by four longer pulses, 2 represented by two short pulses followed by three longer pulses and so on.

In some embodiments the pulse sequence generator 301 is configured to generate with the pulses of two or more lengths a number based on a binary number. This for example, where a long pulse represents a one in binary and a short pulse represents a zero in binary, the number 4 can be generated by a pulse sequence of 'short', 'long', 'short', 'short', a number value 8 can be generated by a pulse sequence of 'long', 'short', 'short', 'short' and a number 0 can be generated by a pulse sequence of 'short', 'short', 'short', 'short'. In the above example the binary representation is a fixed length binary representation of the number. However it would be understood that variable length binary representation of the number can be employed in some embodiments.

In the example provided above the personal identification number or number password is generated by a combination of conventional key contact or key press values and a final tactile value determination. However it would be understood that in some embodiments the full pin number or password can be generated by tactile input alone.

Figure 6:
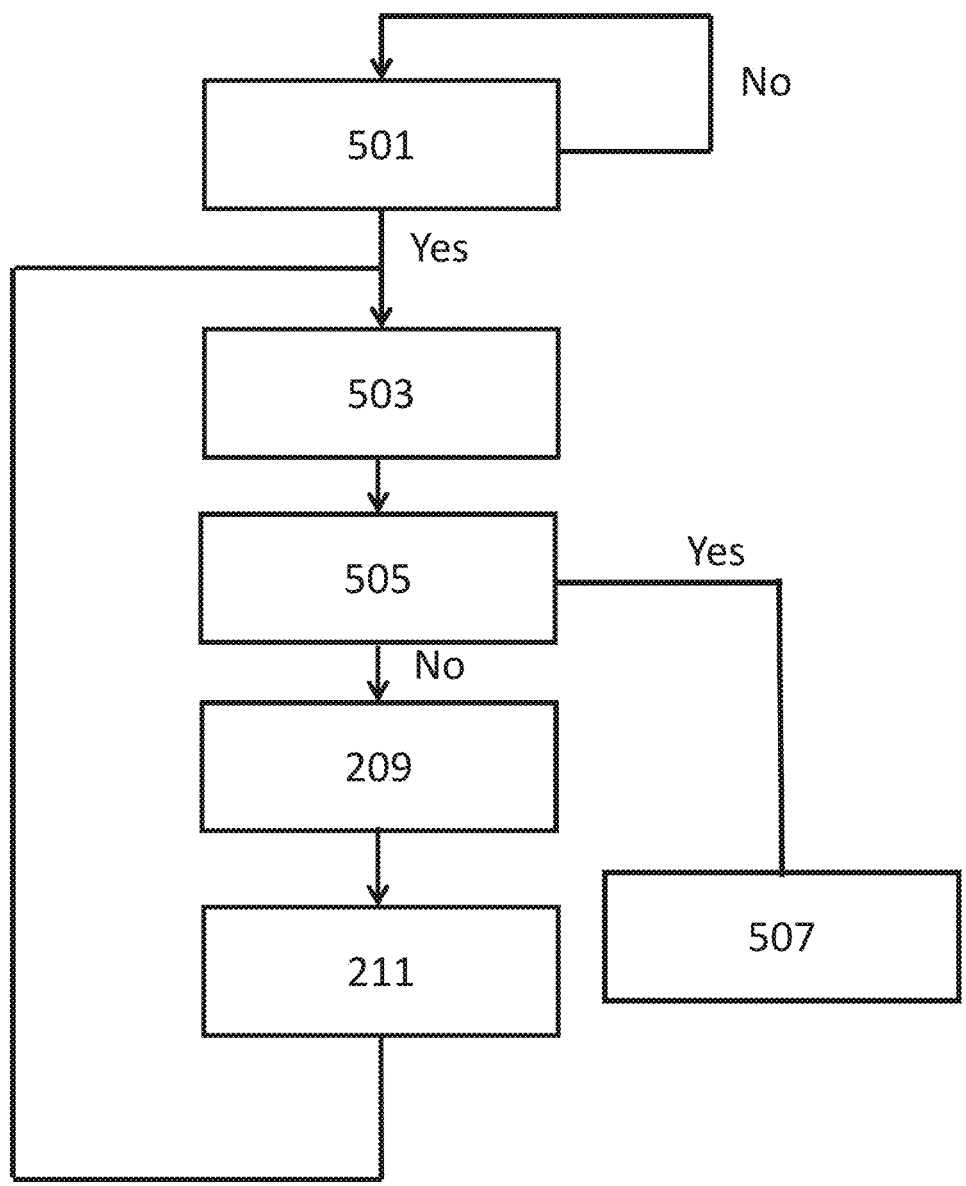
FIG. 6 schematically depicts a flow diagram showing a further example method of operating the electronic apparatus according to some embodiments.

For example FIG. 6 shows a full tactile input password or pin determination method where the only physical key press value which is processed is that of the key press enter value.

Thus in this example the card reader of the ATM determines that the card has been inserted and requests that a personal identification number is input or entered.

The operation of detecting or determining the card has been inserted is shown in FIG. 6 by step 501.

The user then contacts (or presses one of the keys or the surface), which is detected or determined by the contact determiner 307.

The operation of determining a contact (that a key has been pressed or the surface contacted) is shown in FIG. 6 by step 503.

The contact determiner 307 (or the output generator 309) can in some embodiments then be configured to determine whether the surface contact (or key contact or key press) is the enter key.

The check step to determine whether the surface contact (key contact) was the enter key is shown in FIG. 6 by step 505.

Where the contact determiner 307 (or in some embodiments the output generator 309) determines that the surface contact was that of the enter key then the output generator 309 outputs the number string.

The output of the number string operation is shown in FIG. 6 by step 507.

Where the contact determiner 307 (or in some embodiments the keypad output generator 309) determines that the surface contact is a key other than the enter key, such as the numerical keys, then the contact touch determiner 307 is configured to control the pulse sequence generator 301 to generate a pulse sequence such as described herein in order to determine a tactile input value.

This determination of a tactile input value is described herein and is shown with respect to FIG. 6 in step 209.

Furthermore the contact determiner 307 can be configured to output the tactile input value which is then appended to a password (or personal identification number) string.

Furthermore the operation of appending the tactile input value to the number or password string is shown in FIG. 6 by the step 211.

Following the appending of the tactile input value the operation can pass back to the step 503 where the contact determiner is configured to wait or determine when the next contact of the surface is made (in other words the next key contact or key press occurs).

It would be understood that in such embodiments any observation of the user pressing keys or contacting the surface has no direct link between the keys or the locations being contacted or pressed and the output (numerical) password string used as the personal identification number. In such a way the user can contact or touch keys to represent a false number value (by pressing any suitable combination of keys) while entering the correct personal identification number value based on the tactile key value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for providing a user access to a computer system, the method comprising:
   determining, by the computer system, at least one object in contact with a surface of the computer system;
   generating, by the computer system, at least one pulse sequence based on determining the at least one object in contact with the surface of the computer system, wherein the at least one pulse sequence identifies at least two characters;
   actuating the surface of the computer system based on the at least one pulse sequence generated by the computer system;
   determining, by the computer system, an absence of the at least one object from the surface of the computer system; and
   responsive to determining the absence of the at least one object from the surface of the computer system, determining, by the computer system, at least one character of a password input based on the at least one pulse sequence before the absence of the at least one object from the surface of the computer system by determining the at least one character based on a last one of a series of pulse sequences actuated before determining the absence of the at least one object from the surface at a determined location or key.

2. The method as claimed in claim 1, wherein:
   the determining the at least one object in contact with the surface comprises determining the at least one object continuously in contact with the surface at the determined location or key;
   the generating the at least one pulse sequence comprises generating the series of pulse sequences while the at least one object is in contact with the surface at the determined location or key;
   the actuating the surface based on the at least one pulse sequence comprises sequentially actuating the surface using the series of pulse sequences while the at least one object is in contact with the surface at the determined location or key;
   the determining the absence of the at least one object from the surface is performed responsive to having determined the at least one object continuously in contact with the surface at the determined location or key; and
   the series of pulse sequences do not identify a particular character associated with a particular location of the contact with the surface.

3. The method as claimed in claim 1, wherein generating the at least one pulse sequence comprises generating groups of at least one pulse, each group of the groups of at least one pulse separated by a determined time period, wherein determining at least one character of a password input based on the at least one pulse sequence comprises counting the number of groups of at least one pulse generated prior to determining the absence of the at least one object from the surface, wherein the absence of the at least one object from the surface of the computer system comprises removal of the at least one object from the surface of the computer system.

4. The method as claimed in claim 1, wherein generating the at least one pulse sequence comprises generating groups of sequentially increasing numbers of pulses, each group of the groups of sequentially increasing numbers of pulses separated by a determined time period, wherein determining at least one character of a password input based on the at least one pulse sequence comprises determining the number of pulses in the each group of the groups of sequentially increasing number of pulses prior to determining the absence of the at least one object from the surface, wherein the absence of the at least one object from the surface of the computer system comprises removal of the at least one object from the surface of the computer system.

5. The method as claimed in claim 1, wherein generating at least one pulse sequence comprises: pseudo-randomly distributing numbers from a range of numbers; generating groups of pulse(s) associated with the numbers according to the pseudo-random distribution; each group of pulse(s) of the groups of pulse(s) separated by a determined time period, wherein determining at least one character of a password input based on the at least one pulse sequence comprises determining a number of pulse(s) in the each group of pulses prior to determining the absence of the at least one object from the surface, wherein the absence of the at least one object from the surface of the computer system comprises removal of the at least one object from the surface of the computer system.

6. The method as claimed in claim 1, wherein generating at least one pulse sequence comprises generating groups of a constant number of pulse(s), each group of the groups of the constant number of pulse(s) separated by a determined time period, and wherein determining at least one character of a password input based on the at least one pulse sequence comprises counting the number of determined time periods prior to determining the absence of the at least one object from the surface.

7. The method as claimed in claim 6, further comprising pseudo-randomly determining a time period for the determined time period.

8. The method as claimed in claim 1, wherein the determined location or key where the absence of the at least one object from the surface is determined is a number key.

9. The method as claimed in claim 1, wherein the absence of the at least one object from the surface of the computer system comprises removal of the at least one object, that was in contact with the surface, from the surface.

10. The method as claimed in claim 1, further comprising: responsive to determining another absence of the at least one object from the surface of the computer system, determining a further character of the password input at the determined location or key.

11. An electronic apparatus for providing a user access to a computer system, apparatus comprising:
a contact determiner configured to determine at least one object in contact with a surface and furthermore configured to determine an absence of the at least one object from the surface;
a pulse sequence generator coupled to the contact determiner and configured to generate at least one pulse sequence based on the contact determiner, wherein the at least one pulse sequence identifies at least two characters;
an actuator coupled to the pulse sequence generator and configured to actuate the surface based on the at least one pulse sequence; and
an output generator coupled to the contact determiner and configured to output at least one character of a password input and at least one further character of the password input based on the at least one pulse sequence and the contact determiner, wherein the at least one character of the password input is determined responsive to the contact determiner determining the absence of the at least one object from the surface and based on a last one of the at least one pulse sequence actuated before the contact determiner determines the absence of the at least one object from the surface.

12. The electronic apparatus as claimed in claim 11, wherein:
the pulse sequence generator is configured to generate a series of pulse sequences based on the contact determiner determining the at least one object in contact with the surface at a determined location or key;
the actuator is configured to actuate the surface using the series of pulse sequences while the at least one object is in contact with the surface at the determined location or key; and
the series of pulse sequences do not identify a particular character associated with a particular location of the contact with the surface.

13. The electronic apparatus as claimed in claim 11, wherein the pulse sequence generator is configured to generate groups of at least one pulse, each group of the groups of at least one pulse separated by a determined time period, wherein the output generator is configured to count the number of groups of at least one pulse prior to the contact determiner determining the absence of the at least one object from the surface to determine the at least one character.

14. The electronic apparatus as claimed in claim 11, wherein the pulse sequence generator is configured to generate groups of sequentially increasing numbers of pulses, each group of the groups of sequentially increasing numbers of pulses separated by a determined time period, wherein the output generator is configured to determine the number of pulses in the each group of the groups of sequentially increasing number of pulses prior to the contact determiner determining the absence of the at least one object from the surface to determine the at least one character.

15. The electronic apparatus as claimed in claim 11, wherein the pulse sequence generator is configured to generate a pseudo-random distribution of numbers from a range of numbers and generate groups of pulse(s) associated with the numbers according to the pseudo-random distribution, each group of pulses of the groups of pulse(s) separated by a determined time period; and the output generator is configured to determine a number of pulse(s) in the each group of pulse(s) prior to the contact determiner determining the absence of the at least one object from the surface to determine the at least one character.

16. The electronic apparatus as claimed in claim 11, wherein the pulse sequence generator is configured to generate groups of a constant number of pulse(s), each group of the groups of the constant number of pulse(s) separated by a determined time period, and wherein the output generator is configured to determine a number of determined time periods prior to the contact determiner determining the absence of the at least one object from the surface to determine the at least one character.

17. The electronic apparatus as claimed in claim 11, wherein the actuator comprises at least one of:
an air pump controlled based on the at least one pulse sequence;
a coil and permanent magnet, wherein current passing though the coil is controlled based on the at least one pulse sequence;
a vibra controlled based on the at least one pulse sequence; and a piezo-electric actuator controlled based on the at least one pulse sequence.

18. The electronic apparatus as claimed in claim 11, wherein the actuator is configured to actuate a button or key located on the surface, wherein the button or key and the actuator are damped with respect to a surrounding surface.

19. The electronic apparatus as claimed in claim 11, wherein the contact determiner is further configured to:
  determine a parameter associated with the contact with the surface;
  determine a duration of the contact with the surface; and
  control the pulse sequence generator and the output generator based on the parameter and the duration.

20. A method for providing a user access to a computer system, the method comprising:
  determining, by the computer system, at least one object in contact with a surface of the computer system;
  generating, by the computer system, at least one pulse sequence based on determining the at least one object in contact with the surface of the computer system;
  actuating the surface of the computer system based on the at least one pulse sequence generated by the computer system;
  determining, by the computer system, an absence of the at least one object from the surface of the computer system;
  responsive to determining the absence of the at least one object from the surface of the computer system, determining, by the computer system, at least one character of a password input based on the at least one pulse sequence before the absence of the at least one object from the surface of the computer system by determining the at least one character based on a last one of a series of pulse sequences actuated before determining the absence of the at least one object from the surface at a determined location or key; and
  determining, by the computer system, at least one further character of the password input based on another location of the at least object in contact with the surface, wherein the password input comprises a combination of a key value entered at the another location and the at least one pulse sequence.

* * * * *